United States Patent [19]

Narisawa et al.

[11] 4,299,941
[45] Nov. 10, 1981

[54] PROCESS FOR PRODUCING AQUEOUS EMULSIONS OF VINYL CHLORIDE/VINYL ESTER/ETHYLENE COPOLYMER

[75] Inventors: Shizuo Narisawa; Takeo Oyamada, both of Ichihara, Japan

[73] Assignee: Sumitomo Chemical Company, Limited, Osaka, Japan

[21] Appl. No.: 78,138

[22] Filed: Sep. 24, 1979

[30] Foreign Application Priority Data

Sep. 26, 1978 [JP] Japan ............................... 53-118979
Jun. 20, 1979 [JP] Japan ............................... 54-78603

[51] Int. Cl.³ ................... C08F 222/28; C08F 222/26
[52] U.S. Cl. ................................. 526/273; 156/327; 260/29.6 T; 526/200; 526/209; 526/322; 526/323; 526/324; 526/922
[58] Field of Search .............. 260/29.6 T, 29.6 MQ, 260/29.6 ME; 526/213, 216, 322, 324, 273

[56] References Cited

U.S. PATENT DOCUMENTS

| | | | |
|---|---|---|---|
| 2,934,529 | 4/1960 | van Kijk | 526/213 X |
| 3,501,440 | 3/1970 | Kamio | 526/324 X |
| 3,539,488 | 11/1970 | Klopfer | 204/159.17 |
| 3,925,327 | 12/1975 | Mitsushima | 526/322 |
| 3,979,366 | 9/1976 | Schwab | 526/345 |
| 4,123,405 | 10/1978 | Oyamada | 526/80 X |
| 4,128,518 | 12/1978 | Oyamada | 260/29.6 WB |

Primary Examiner—C. A. Henderson
Attorney, Agent, or Firm—Birch, Stewart, Kolasch and Birch

[57] ABSTRACT

An improved process for producing an aqueous emulsion of a vinyl chloride/vinyl ester/ethylene copolymer having a small heat fluidity and excellent strength which comprises continuously adding a solution of a specific polybasic acid polyallyl ester in the vinyl chloride and/or vinyl ester and further at least 60% by weight of the vinyl chloride and vinyl ester to the polymerization system during the polymerization reaction. The copolymer thus produced has a large benzene-insoluble part and the aqueous emulsion thereof is stable and is useful as an adhesive, as for paint compositions, or as a binder for fibers and papers.

7 Claims, 1 Drawing Figure

PROCESS FOR PRODUCING AQUEOUS EMULSIONS OF VINYL CHLORIDE/VINYL ESTER/ETHYLENE COPOLYMER

BACKGROUND OF THE INVENTION

The present invention relates to a process for producing aqueous emulsions of vinyl chloride/vinyl ester/ethylene copolymer having an improved heat fluidity.

It is well known that aqueous emulsions of a copolymer of vinyl chloride, a vinyl ester (e.g. vinyl acetate) and ethylene have excellent properties such as excellent water resistance and alkali resistance and are widely used as an adhesive, paint and a binder for processing of fibers and papers. In order to improve the properties such as water resistance, flame retardant properties and chemical resistance of these aqueous emulsions of a vinyl chloride/vinyl acetate/ethylene copolymer, the amount of vinyl chloride to be copolymerized may be increased. However, when the amount of vinyl chloride is increased, the resulting copolymer of vinyl chloride/vinyl acetate/ethylene has a lower molecular weight and the aqueous emulsion of the copolymer shows undesirably a large heat fluidity. For instance, when the aqueous emulsion of a vinyl chloride/vinyl acetate/ethylene copolymer having a lower molecular weight is used as an adhesive for a thermoplastic resin and the resulting thermoplastic resin product is subjected to embossing, the emboss is easily deformed by subjecting the product to heat. Moreover, when the aqueous emulsion is used as a vehicle of a paint composition, the coating film obtained therefrom has an inferior strength, for example, an inferior washing resistance. Furthermore, when the aqueous emulsion is used as a binder for fibers, the fibers are inferior in heat stability because of the large heat fluidity due to the copolymer.

It is known that a polyfunctional monomer having two or more polymerizable double bonds in the molecule can be introduced into a copolymer in order to increase the molecular weight of the polymers or copolymers and that the polyfunctional monomer is used as a cross linking agent, and thereby, a gel insoluble in an organic solvent can be produced. For example, it is disclosed in Japanese Patent Publication No. 37012/1977 that an aqueous emulsion of vinyl acetate/ethylene copolymer is produced by using a vinyl ester of a polybasic acid or an allyl ester of a polyfunctional acid as a cross linking agent in order to improve the solvent resistance or mechanical properties at a high temperature. According to re-examination of this process by the present inventors, however, when triallyl cyanurate as used in the working example of this Japanese patent was used as a cross linking agent, the resulting copolymer had an increased amount of benzene-insoluble part as desired, but the aqueous emulsion of the copolymer contained a large amount of coarse particles and produced a large amount of precipitates during storage thereof, that is, the aqueous emulsion was very unstable.

Furthermore, it is disclosed in Japanese Patent Publication No. 19179/1971 that when divinyl succinate or glycol dimethacrylate is used in an amount of up to 1% by weight (based upon the total weight of the monomers) in the preparation of an aqueous emulsion of vinyl chloride/vinyl acetate/ethylene copolymer having a vinyl chloride content of 35% by weight or less, the molecular weight of the copolymer is increased and a cross linked copolymer can be produced. It is also disclosed in Japanese Patent Publication No. 9671/1967 that saturated hydrocarbon diol divinyl ethers or dibasic acid diallyl esters can be used for producing a polyvinyl chloride having a high degree of polymerization and having low heat deformation properties and an excellent processability without producing a large amount of gel which is insoluble in an organic solvent. However, neither improvement of the properties of vinyl chloride/vinyl ester/ethylene copolymer nor increase of the amount of benzene-insoluble part nor increase of the molecular weight could be achieved even when glycol dimethacrylate or glycol diacrylate as disclosed in Japanese Patent Publication No. 19179/1971 or octadecandiol divinyl ether or trifunctional monomer triacrylate or trimethacrylate as disclosed in Japanese Patent Publication No. 9671/1967 was used in an amount of up to 1% by weight based upon the total weight of the monomers.

Moreover, there are disclosed in Japanese Patent Publication No. 32787/1974 unsaturated carboxylic acids, acrylonitrile, nitrogen-containing unsaturated compounds, allyl compounds (e.g. diallyl phthalate) and divinyl compounds (e.g. divinylbenzene) which may participate in copolymerization in the production of aqueous emulsions of copolymers of olefins, vinyl halides, vinyl esters and alkyl acrylates or alkyl methacrylates.

However, not all polyfunctional monomers containing two or more polymerizable double bonds in the molecule can be necessarily used for increasing the molecular weight of polymers or copolymers and for producing an organic solventinsoluble part by cross linking of the copolymer. Even if they can provide the desired polymer or copolymer, the aqueous emulsions thereof are occasionally unstable. Accordingly, careful attention should be paid to selection of the most suitable polyfunctional monomers depending on the kinds and the desired properties of the polymers or copolymers and also selection of the most suitable usage of the monomers.

SUMMARY OF THE INVENTION

The present inventors have intensively studies to improve the properties such as heat fluidity and strength of aqueous emulsions of vinyl chloride/vinyl ester/ethylene copolymer having a larger vinyl chloride content without deteriorating the basic characteristics of the copolymer. As a result, it has been found that the desired aqueous emulsion of the copolymer having remarkably improved heat fluidity and strength can be obtained, when a polybasic acid polyallyl ester of the formula (I):

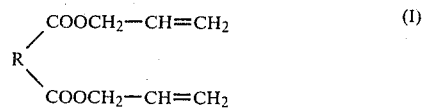

wherein R is a hydrocarbon group having 2 to 10 carbon atoms, and/or the formula (II):

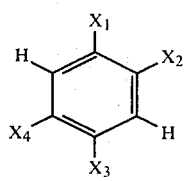

(II)

wherein $X_1$, $X_2$, $X_3$ and $X_4$ are all the group: $-COOCH_2-CH=CH_2$ or any one of them is hydrogen and the other three are the group: $-COOCH_2-CH=CH_2$, is dissolved in vinyl chloride and/or the vinyl ester to be copolymerized in an amount of 0.1 to 1.0% by weight based on the total weight of the vinyl chloride and vinyl ester and the mixture is continuously added to the polymerization system and further at least 60% by weight of the vinyl chloride and vinyl ester are continuously added to the polymerization system during emulsion polymerization of vinyl chloride and a vinyl ester.

An object of the present invention is to provide an aqueous emulsion of a vinyl chloride/vinyl ester/ethylene copolymer having a small heat fluidity. Another object of the invention is to provide an improved process for the production of the desired aqueous emulsion of the copolymer. Other objects and advantages of the invention will be apparent from the following description.

According to the present invention, the desired aqueous emulsion of a vinyl chloride/vinyl ester/ethylene copolymer can be produced by copolymerising vinyl chloride and a vinyl ester under ethylene pressure in the presence of an emulsion-dispersing agent and a radical polymerization initiator under the following specific conditions:

(1) by continuously adding a solution of a polybasic acid polyallyl ester of the formula (I) and/or (II) in vinyl chloride and/or the vinyl ester as mentioned hereinbefore in an amount of 0.1 to 1.0% by weight based on the total weight of the vinyl chloride and vinyl ester to the polymerization system, and (2) by continuously adding at least 60% by weight of vinyl chloride and vinyl ester to be copolymerized based on the total weight of the vinyl chloride and vinyl ester to the polymerization system.

The thus obtained copolymer comprises 20 to 75% by weight of vinyl chloride, 15 to 70% by weight of vinyl ester and 5 to 30% by weight of ethylene and contains 5 to 60% by weight of benzene-insoluble part and also has a small heat fluidity (i.e. fluidity under heating).

The accompanying drawing shows a graph of the relationship between the fluidity (closing of a plunger) of various copolymers and the temperature, wherein the ordinate axis represents the closing of a plunger (magnification degree: 15 times, mm) and the abscissa axis is the temperature (°C.).

The polybasic acid polyallyl ester used in the present invention includes diallyl esters of dibasic acids such as phthalic acid, isophthalic acid, terephthalic acid, maleic acid, itaconic acid, succinic acid and adipic acid; benzene-tricarboxylic acid triallyl ester; benzenetetracarboxylic acid tetraallyl ester; or the like, which may be used alone or in combination of two or more thereof.

The polybasic acid polyallyl ester is used in an amount of 0.1 to 1.0% by weight, preferably 0.2 to 0.8% by weight, based on the total weight of vinyl chloride and vinyl ester to be copolymerized, by which there can be obtained the desired aqueous emulsion of vinyl chloride/vinyl ester/ethylene copolymer containing benzene-insoluble part of 5 to 60% by weight, preferably 10 to 50% by weight. When the polybasic acid polyallyl ester is used in an amount of smaller than 0.1% by weight, there can not be obtained a copolymer containing a benzene-insoluble part of 5% by weight or more, and the properties such as heat fluidity and strength of the copolymer can not be improved. On the other hand, when the amount of the polyallyl ester is over 1.0% by weight, the resulting copolymer contains more than 60% by weight of benzene-insoluble part and hence a stable aqueous emulsion can not be obtained.

It is essential in the present invention to continuously add a solution of the polybasic acid polyallyl ester in vinyl chloride and/or a vinyl ester and further at least 60% by weight of vinyl chloride and vinyl ester to the polymerization system during the polymerization reaction, by which there can be obtained the desired stable aqueous emulsion of copolymer containing uniformly a benzene-insoluble part.

When the polybasic acid polyallyl ester is added before the initiation of the polymerization reaction, or is unevenly added, or is added without dissolving a vinyl chloride and/or vinyl ester, the content of a benzene-insoluble part in the copolymer varies and further the resulting aqueous emulsion contains a large amount of coarse particles and is inferior in stability. Besides, when the total amount of vinyl chloride and vinyl ester to be added before the initiation of the polymerization reaction is over 40% by weight, the copolymer produced at the first stage of the polymerization reaction has components largely different from those of the copolymer produced at the final stage of the polymerization reaction. In the latter case, even when the polybasic acid polyallyl ester is added after dissolving in the monomer, the aqueous emulsion has coarse particles and is unstable.

Thus, the process of the present invention is preferably carried out as follows:

Less than 4% by weight of the vinyl chloride and vinyl ester is firstly charged into the reactor and then the polymerization reaction is initiated under ethylene pressure, and thereafter, the remaining 60% by weight or more of the vinyl chloride and vinyl ester is continuously and uniformly added to the reaction system under ethylene pressure, wherein the polybasic acid polyallyl ester is dissolved in the vinyl chloride and/or vinyl ester which are continuously added during the polymerization reaction or is uniformly dissolved in the whole amount of vinyl chloride and/or vinyl ester which are added at the initiation and during the polymerization reaction.

The vinyl ester used in the present invention includes vinyl acetate, vinyl propionate, vinyl butyrate, vinyl laurate, vinyl tertiary carboxylate or the like. Among them, vinyl acetate is most preferable, and vinyl acetate may be used in a mixture thereof with a small amount of other vinyl esters as mentioned above.

The polymerization reaction may usually be carried out in the presence of a radical polymerization initiator. The radical polymerization initiator may be any conventional radical initiator which is usually used in an emulsion polymerization, but is preferably a so-called Redox catalyst consisting of an oxidizing agent such as hydrogen peroxide, persulfates (e.g. ammonium persulfate or potassium persulfate), or perborate, and a reducing agent such as l-ascorbic acid, sodium bisulfite, rongalite, sodium glyoxal bisulfite or ferrous sulfate.

The polymerization reaction may also be carried out in the presence of an emulsion-dispersing agent. The emulsion-dispersing agent may be any conventional dispersing agent which is usually used in an emulsion polymerization, for example, various water-soluble high molecular compounds (used as a protective colloid) and various nonionic or anionic surfactants (used as an emulsifying agent), which may be used alone or in combination thereof. The water-soluble high molecular compounds used as a protective colloid include polyvinyl alcohol, partially saponified polyvinyl alcohol, cellulose derivatives (e.g. methyl cellulose, hydroxyethyl cellulose), or the like.

Nonionic surfactants include polyoxyethylene alkyl ethers or polyoxyethylene alkyl phenol ethers (e.g. polyoxyethylene lauryl ether, polyoxyethylene octyl phenol ether, or polyoxyethylene nonyl phenol ether), polyoxyethylene sorbitan fatty acid esters (e.g. polyoxyethylene sorbitan monolaurate, or polyoxyethylene sorbitan monooleate), polyoxyethylene-polyoxypropylene block copolymer having an ethylene oxide addition amount of 10 to 80%, or the like. Anionic surfactants include higher alcohol sulfuric acid ester salts (e.g. sodium lauryl sulfate), polyoxyethylene sulfate salts (e.g. sodium polyoxyethylene alkyl sulfate, or sodium polyoxyethylene alkyl phenyl sulfate), dialkyl sulfosuccinate salts (e.g. sodium dialkyl sulfosuccinate), alkylbenzene sulfonate salts, or the like.

The emulsion polymerization is also preferably carried out while keeping the pH value at 3 to 7 with an appropriate pH value regulator. The pH value regulators include any conventional pH value regulators, for example, ammonium bicarbonate, sodium bicarbonate, disodium phosphate, sodium pyrophosphate, sodium acetate, aqueous ammonia, acetic acid, hydrochloric acid, or the like, which may be used alone or in combination of two or more thereof.

Other conditions for the polymerization of the present invention are the same as usually used in the conventional emulsion polymerization for the preparation of vinyl chloride/vinyl ester/ethylene copolymer emulsion, for example, a polymerization temperature of about 30° to 70° C. and a polymerization pressure of about 15 to 150 kg/cm$^2$ in case of a copolymer of an ethylene content of 5 to 30% by weight. The ratio of the vinyl chloride and vinyl ester may be optionally determined depending on the desired components of the copolymer.

The process of the present invention may also be applied to the production of an aqueous emulsion of so-called reaction type vinyl chloride/vinyl ester/ethylene copolymer wherein a vinyl monomer having a functional group is copolymerized in addition to the vinyl chloride, vinyl ester and ethylene monomers.

The vinyl monomer having a functional group includes vinyl monomers having a glycidyl group (e.g. glycidyl acrylate, or glycidyl methacrylate), vinyl monomers having an N-methylol group (e.g. N-methylolacrylamide, or N-methylolmethacrylamide), vinyl monomers having an alkoxymethyl group, i.e. a compound obtained by replacing the N-methylol group of the above N-methylol-containing vinyl monomer with $C_{1-4}$ alkyl ether such as ethyl ether or butyl ether (e.g. N-alkoxymethylacrylamide, or N-alkoxymethylmethacrylamide), vinyl monomers having a carboxyl group (e.g. acrylic acid, itaconic acid, or maleic acid), vinyl monomers having a hydroxyalkyl group (e.g. 2-hydroxyethyl acrylate, or 2-hydroxyethyl methacrylate), or the like, which may be used alone or in combination of two or more thereof. These vinyl monomers having a functional group such as N-methylol, alkoxymethyl, carboxyl or hydroxyalkyl group may be used in an amount of up to 10% by weight based on the total weight of vinyl chloride, vinyl ester and ethylene, in which the copolymerization reaction is not inhibited. These functional vinyl monomers as mentioned above are also preferably continuously added to the polymerization system after dispersing or dissolving in the vinyl chloride and/or vinyl ester similarly as the polybasic acid polyallyl ester.

The aqueous emulsion of a vinyl chloride/vinyl ester/ethylene copolymer produced by the present invention is useful as an adhesive, a binder for fibers and a vehicle for paint compositions. When the aqueous emulsion of the present invention is used as an adhesive or a binder for fibers, it shows greater heat stability in comparison with the conventional copolymer aqueous emulsions. Besides, a coating composition obtained from the copolymer of the present invention, pigments and other conventional additives can give a coating film having greater strength and washing resistance in comparison with the composition of the conventional copolymer.

DETAILED DESCRIPTION OF THE INVENTION

Figure 1:
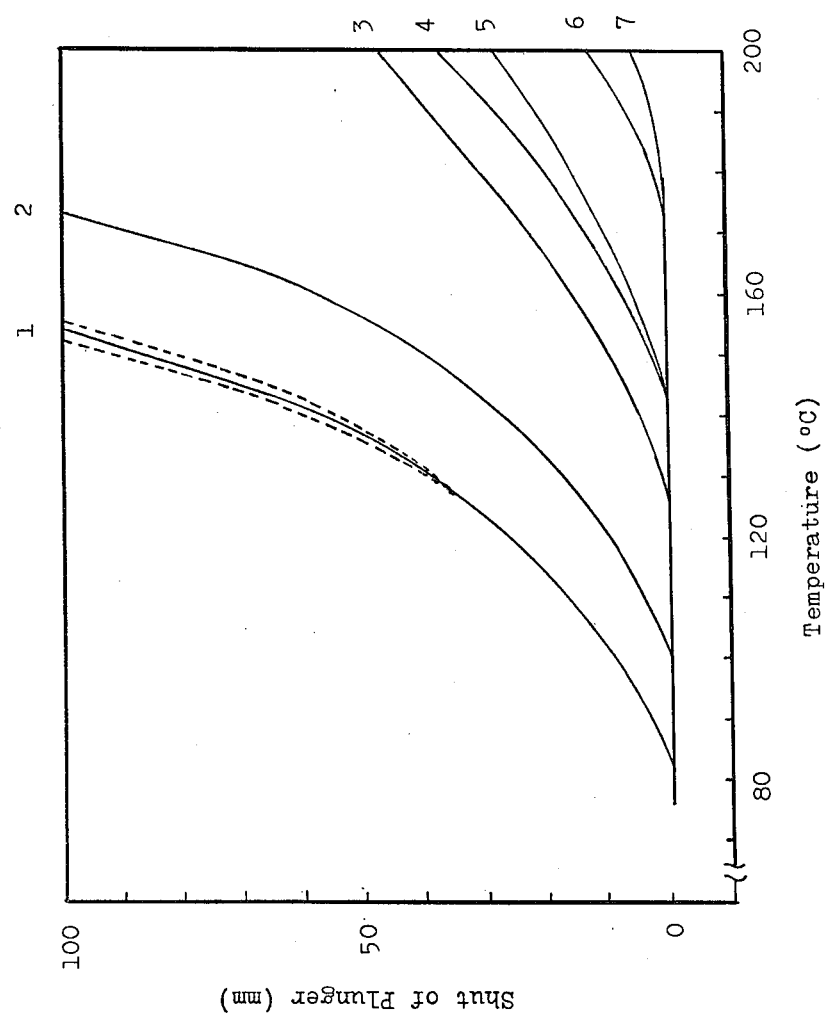

The present invention is illustrated by the following Examples but is not limited thereto.

Example 1

The following components are charged into a pressure reactor.

| | |
|---|---|
| water | 12,800 g |
| Hydroxyethyl cellulose | 120 g |
| Polyoxyethylene lauryl ether | 130 g |
| Polyoxyethylene nonyl phenol ether | 130 g |
| Sodium lauryl sulfate | 60 g |
| Acetic acid | 7 g |
| Sodium acetate | 8 g |
| FeSO$_4$ | 0.3 g |
| Rongalite (sodium formaldehyde | 90 g |
| Vinyl acetate | 1,726 g |

The reactor is purged with nitrogen and ethylene, and thereto is added vinyl chloride (1,643 g) and further there is added ethylene until a pressure of 60 is reached kg/cm$^2$. To the mixture is added 8% by weight aqueous solution of ammonium persulfate, and then, the polymerization reaction is started. The polymerization temperature is regulated to 50° C. A mixture of vinyl chloride (4,225 g), vinyl acetate (4,436 g) and diallyl isophthalate (30.1 g) is added to the polymerization mixture in a constant rate over a period of 5 hours. After copolymerizing for about 7 hours when unreacted vinyl acetate becomes 0.3% by weight, the reaction mixture is cooled and unreacted ethylene is removed.

The aqueous emulsion of vinyl chloride/vinyl acetate/ethylene copolymer thus obtained has a solids content of 51% by weight and has only 13 ppm of coarse particles which can not pass through a 100 mesh wire mesh. The aqueous emulsion is very stable, and even when the aqueous emulsion is kept for a long period of time, no precipitate occurs.

The copolymer comprises 40% by weight of vinyl chloride, 42% by weight of vinyl acetate and 18% by weight of ethylene and contains 21% by weight of benzene-insoluble part.

Example 2

Example 1 is repeated except that diallyl phthalate (72.2 g) is used instead of diallyl isophthalate. As a result, there is obtained a stable aqueous emulsion of vinyl chloride/vinyl acetate/ethylene copolymer having less coarse particles and containing 36% by weight of benzene-insoluble part.

Example 3

Example 1 is repeated except that triallyl 1,2,4-benzenetricarbonate (40.6 g) is used instead of diallyl isophthalate. As a result, there is obtained a stable aqueous emulsion of vinyl chloride/vinyl acetate/ethylene copolymer having less coarse particles and containing 28% by weight of benzene-insoluble part.

Example 4

The following components are charged into a pressure reactor.

| | |
|---|---|
| water | 12,800 g |
| Hydroxyethyl cellulose | 120 g |
| Polyoxyethylene lauryl ether | 150 g |
| Polyoxyethylene nonyl phenol ether | 160 g |
| Acetic acid | 7 g |
| Sodium acetate | 8 g |
| $FeSO_4$ | 0.3 g |
| Rongalite (sodium formaldehyde sulfoxylate) | 90 g |
| Vinyl acetate | 1,095 g |

The reactor is purged with nitrogen and ethylene, and thereto is added vinyl chloride (2,346 g) and there is further added ethylene until a pressure of 45 kg/cm² is reached. To the mixture is added 8% by weight aqueous solution of ammonium persulfate, and then, the polymerization reaction is started. The polymerization temperature is regulated to 50° C. A mixture of vinyl chloride (5,474 g), vinyl acetate (2,554 g) and diallyl phthalate (72.2 g) and a solution of N-methylolacrylamide (250 g) in water (1,000 g) are added to the polymerization mixture in a constant rate over a period of 5 hours from two inlets, respectively. After copolymerizing for about 6.5 hours when unreacted vinyl acetate becomes 0.3% by weight, the reaction mixture is cooled and unreacted ethylene is removed.

The aqueous emulsion of vinyl chloride/vinyl acetate/ethylene copolymer thus obtained has a solids content of 51.2% by weight and has only 10 ppm of coarse particles which can not pass through a 100 mesh wire mesh. The aqueous emulsion is very stable, and even when the aqueous emulsion is kept for a long period of time, no precipitate occurs.

The copolymer comprises 60% by weight of vinyl chloride, 28% by weight of vinyl acetate, 10% by weight of ethylene and 2% by weight of N-methylolacrylamide and contains 39% by weight of benzene-insoluble part.

Example 5

Example 4 is repeated except that triallyl 1,2,4-benzenetricarboxylate (60 g) is used instead of diallyl phthalate. As a result, there is obtained a stable aqueous emulsion of vinyl chloride/vinyl acetate/ethylene copolymer having less coarse particles and containing 50% by weight of benzene-insoluble part.

Example 6

The following components are charged into a pressure reactor.

| | |
|---|---|
| water | 12,800 g |
| Hydroxyethyl cellulose | 120 g |
| Polyoxyethylene lauryl ether | 150 g |
| Polyoxyethylene nonyl phenol ether | 160 g |
| Acetic acid | 7 g |
| Sodium acetate | 8 g |
| $FeSO_4$ | 0.3 g |
| Rongalite (sodium formaldehyde sulfoxylate) | 90 g |
| Vinyl acetate | 1,101 g |

The reactor is purged with nitrogen and ethylene, and thereto is added vinyl chloride (1,193 g) and further is added ethylene until a pressure of 55 kg/cm² is obtained. To the mixture is added 8% by weight aqueous solution of ammonium persulfate, and the polymerization reaction is started. The polymerization temperature is regulated to 50° C. A mixture of vinyl chloride (4,771 g), vinyl acetate (4,404 g) and diallyl phthalate (55 g) and a solution of 2-hydroxyethyl acrylate (260 g) in water (1,000 g) are added to the polymerization mixture in a constant rate over a period of 5 hours from two inlets, respectively. After copolymerizing for about 7 hours when unreacted vinyl acetate becomes 0.3% by weight, the reaction mixture is cooled and unreacted ethylene is removed.

The aqueous emulsion of vinyl chloride/vinyl acetate/ethylene copolymer thus obtained has a solids content of 52.6% by weight and has only 7 ppm of coarse particles which can not pass through a 100 mesh wire mesh. The aqueous emulsion is very stable, and even when the aqueous emulsion is kept for a long period of time, no precipitate occurs.

The copolymer comprises 42% by weight of vinyl chloride, 40% by weight of vinyl acetate, 16% by weight of ethylene and 2% by weight of 2-hydroxyethyl acrylate and contains 22% by weight of benzene-insoluble part.

Reference Example 1

Example 1 is repeated except that diallyl isophthalate is not used. As a result, the resulting aqueous emulsion is stable and has less coarse particles, but the copolymer contains only 0.6% by weight of benzene-insoluble part.

Reference Example 2

Example 4 is repeated except that diallyl phthalate is not used. As a result, the resulting aqueous emulsion is stable and has less coarse particles, but the copolymer contains only 1.6% by weight of benzene-insoluble part.

Reference Example 3

Example 1 is repeated except that the same amount of triallyl cyanulate is used instead of diallyl isophthalate. As a result, the resulting copolymer contains 16.8% by weight of benzene-insoluble part, but the aqueous emulsion contains a large amount (about 2,000 ppm) of coarse particles which can not pass through a 100 mesh wire mesh and is unstable, i.e. when it is allowed to stand, precipitates are produced.

Reference Examples 4 to 12

Example 1 is repeated except that the monomers having a functional group as shown in Table 1 are used instead of diallyl isophthalate. The results are shown in Table 1. As is clear from the results, the aqueous emulsions of Reference Examples 4 to 12 have similarly inferior benzene-insoluble part of copolymer like the aqueous emulsion in Reference Example 1.

TABLE 1

| Ref. Ex. No. | Monomer having a functional group | | Benzene-insoluble part of copolymer (% by weight) |
|---|---|---|---|
| | Kind | Amount (% by weight)* | |
| 4 | Diethylene glycol diacrylate | 0.25 | 0.6 |
| 5 | Diethylene glycol diacrylate | 1.00 | 0.7 |
| 6 | Tetraethylene glycol diacrylate | " | 0.9 |
| 7 | Diethylene glycol dimethacrylate | " | 0.8 |
| 8 | Triethylene glycol dimethacrylate | " | 0.7 |
| 9 | Tetraethylene glycol dimethacrylate | " | 0.7 |
| 10 | Tetramethylolmethane triacrylate | " | 0.6 |
| 11 | Trimethylolpropane trimethacrylate | " | 0.9 |
| 12 | Octadecanediol divinyl ether | " | 0.8 |

[Remark]:
*Based on the total weight of vinyl chloride and vinyl acetate.

Reference Example 13

In the same manner as described in Example 1, the polymerization reaction is carried out except that whole amounts of vinyl chloride, vinyl acetate and diallyl isophthalate are charged before initiation of the reaction. As a result, the polymerization pressure is abnormally increased, and further, the resulting aqueous emulsion contains a large amount of coarse particles and hence can hardly be filtered with wire mesh.

Reference Example 14

In the same manner as described in Example 1, the polymerization reaction is carried out except that diallyl isophthalate (30.1 g) is dissolved in vinyl acetate (1,726 g) which is charged before initiation of reaction and the solution is added before the initiation of reaction. As a result, the copolymer thus obtained contains 10% by weight of benzene-insoluble part, but the aqueous emulsion can hardly be filtered with wire mesh and is unstable, i.e. when it is allowed to stand, precipitates are produced.

In the above Examples and Reference Examples, the benzene-insoluble part of the copolymer is measured as follows. The copolymer (1 g) is dissolved in benzene (100 g) at 70° C. over a period of 3 hours, and the mixture passes through 300 mesh wire mesh, and then the amount of copolymer which does not pass through the wire mesh is measured.

Fluidity of the copolymers produced in Examples 1 to 6 and Reference Examples 1, 2 and 4 to 12 was measured by using a KOKA type flow tester (type 301, made by Shimadzu Seisakusho Ltd.) under the conditions of bore diameter of dies: 1 mm, length of the mouth part: 2 mm, preheating: for 10 minutes, pressure: 10 kg/cm$^2$, raising rate of temperature: 6° C./minute, and intention temperature for measurement: 80° C. The fluidity was shown by the closing of the plunger (magnification degree: 15 times, mm). The closing of the plunger (mm) was calculated by measuring the length of the polymer which was extruded through the dies under the above conditions, and multiplying the length by 15. The results are shown in the accompanying FIG. 1, wherein the ordinate axis shows the closing of the plunger and the abscissa axis is the temperature (°C.), and the line 1 is the fluidity of the copolymers of Reference Examples 1 and 2 and the dotted lines mean that the fluidities of the copolymers of Reference Examples 4 to 12 are included within the dotted lines, and lines 2, 3, 4, 5, 6 and 7 are the fluidity of the copolymers of Examples 1, 2, 3, 4, 5 and 6, respectively.

As is clear from FIG. 1, the copolymers of Examples 1 to 6 which contain a large amount of benzeneinsoluble part have an improved fluidity in comparison with the copolymers of Reference Examples 1 and 2 which contain only a small amount of benzene-insoluble part. The copolymers of Reference Examples 4 to 12 have similar fluidity to that of the copolymers of Reference Examples 1 and 2.

Examples 7 to 10 and Reference Examples 15 and 16

By using the aqueous emulsions of copolymer obtained in Examples 1, 2, 3 and 6 Reference Examples 1 and 4, emulsion compositions having a pigment concentration of 40% by volume were prepared according to the following formulation.

| Components | Part by weight |
|---|---|
| Natrosol 250 HR (a trade name of 2% aqueous solution of hydroxyethyl cellulose) | 225 |
| Nobco NDW (a trade name of a deforming agent) | 3 |
| Tamol 850 (a trade name of a carboxylated anionic surfactant, sodium salt) | 6 |
| Emalgen 911 (a trade name of a polyoxy-ethylene nonyl phenol ether | 4 |
| Monine (a trade name of an emulsifying agent) | 2 |
| Texanol (a trade name of 2,2,4-trimethyl-1,3-pentanediol monoisobutylate) | 10 |
| Ethylene glycol | 25 |
| Titanium dioxide | 150 |
| Calcium carbonate | 150 |
| Kaolin clay | 50 |
| Water | 115 |
| Aqueous emulsion of copolymer (solid component: 55% by weight) | 360 |

The coating film obtained from the emulsion compositions was tested with respect to the washing resistance in accordance with the method as defined in JIS K 5663 under severe washing conditions such that 2% aqueous solution of a commercially available cleanser was used instead of 0.5% soap. The results are shown in Table 2.

TABLE 2

| Run No. | Example No. of aqueous emulsion | Times of brushing | | |
|---|---|---|---|---|
| | | 500 | 1000 | 2000 |
| Example 7 | Example 1 | ○ | ○ | ○ |
| Example 8 | Example 2 | ○ | ○ | ○ |
| Example 9 | Example 3 | ○ | ○ | ○ |
| Example 10 | Example 6 | ○ | ○ | ○ |
| Reference Example 15 | Reference Example 1 | ○ | ○ ~ Δ | X |

TABLE 2-continued

| Run No. | Example No. of aqueous emulsion | Times of brushing 500 | 1000 | 2000 |
|---|---|---|---|---|
| Example 16 | Example 4 | O | Δ | X |

[Remarks]
O:Coating film was not injured.
Δ:Coating film was fairly worn.
X:Coating film was broken or worn and the base sheet appeared.

As is clear from the results, the emulsion composition of the copolymer of the present invention could give a coating film having excellent washing resistance and excellent strength.

Examples 11 and 12 and Reference Example 17

The aqueous emulsion obtained in Examples 4 and 5 and Reference Example 2 was applied to a sheet of soft vinyl chloride resin (thickness: 0.2 mm) in an amount of 15 g/m$^2$ (converted into the weight of solid component), and the resulting sheet applied with the aqueous emulsion was dried at 130° C. for 3 minutes and was adhered to a base cloth (cotton drill 9A) by passing through embossing rolls (temperature of roll at the side of the vinyl chloride resin sheet: 180° C.) to give an embossed polyvinyl chloride leather.

The embossed polyvinyl chloride leather produced by using the aqueous emulsion of Examples 4 and 5 as an adhesive had a clear and beautiful emboss, but the polyvinyl chloride leather produced by using the aqueous emulsion of Reference Example 2 showed deformation of the emboss.

Besides, the leather obtained above was cut in a width of 2.5 cm, and the sample thus prepared was subjected to a peel test at 180° C. with an autograph under normal conditions or after heat treatment, i.e. after being treated at 100° C. for 24 hours. The results are shown in Table 3.

TABLE 3

| Run No. | Adhesive (Example No. of aqueous emulsion) | Under normal condition (kg/2.5 cm) | After heat treatment (kg/2.5 cm) |
|---|---|---|---|
| Example 11 | Example 4 | 3.6 | 3.4 |
| Example 12 | Example 5 | 3.9 | 3.7 |
| Reference Example 17 | Reference Example 2 | 2.8 | 2.0 |

As is clear from the results, the leather obtained by using the aqueous emulsion of Reference Example 2 was inferior in the peeling strength, particularly after heat treatment, in comparison with the leather obtained by using the aqueous emulsion of Examples 4 and 5.

What is claimed is:

1. In a process for producing a stable aqueous emulsion of a vinyl chloride/vinyl ester/ethylene copolymer having less coarse particles and having a small heat fluidity and an excellent strength without adversely affecting its basic characteristics, including the water resistance, the alkali resistance, the fire retardant properties and the chemical resistance thereof, comprising copolymerizing vinyl chloride, a vinyl ester and ethylene in the presence of an emulsion-dispersing agent and a radical polymerization initiator, under an ethylene pressure, the improvement which comprises, dissolving a polybasic acid polyallyl ester selected from the group consisting of diallyl phthalate, diallyl isophthalate, diallyl terephthalate, diallyl maleate, diallyl itaconate, diallyl succinate, diallyl adipate and triallyl benzenetricarboxylate in the vinyl chloride and/or vinyl ester to be copolymerized in an amount of 0.1 to 1.0% by weight based on the total weight of the vinyl chloride and vinyl ester, and continuously adding the solution to the polymerization system during the polymerization reaction, and continuously adding at least 60% by weight of the vinyl chloride and vinyl ester to the polymerization system during the polymerization reaction, to give an aqueous emulsion of a vinyl chloride/vinyl ester/ethylene copolymer comprising 20 to 75% by weight of vinyl chloride, 15 to 70% by weight of the vinyl ester and 5 to 30% by weight of ethylene and containing 5 to 60% by weight of a benzene-insoluble part.

2. A process for producing an aqueous emulsion according to claim 1, wherein one or more vinyl monomers selected from the group consisting of a vinyl monomer having a glycidyl group, a vinyl monomer having an N-methylol group, a vinyl monomer having an alkoxymethyl group, a vinyl monomer having a carboxyl group and a vinyl monomer having a hydroxyalkyl group are copolymerized in an amount of not more than 10% by weight based on the total weight of the vinyl chloride, vinyl ester and ethylene.

3. A process for producing an aqueous emulsion according to claim 1, wherein the polybasic acid polyallyl ester is used in an amount of 0.2 to 0.8% by weight based on the total weight of the vinyl chloride and vinyl ester.

4. A process for producing an aqueous emulsion according to claim 1, wherein the benzene-insoluble part of the vinyl chloride/vinyl ester/ethylene copolymer is in the range of 10 to 50% by weight.

5. A process for producing an aqueous emulsion according to claim 1, wherein the vinyl ester is a member selected from the group consisting of vinyl acetate, vinyl propionate, vinyl butyrate, vinyl laurate and vinyl tertiary carboxylate.

6. A process for producing an aqueous emulsion according to claim 5, wherein the vinyl ester is vinyl acetate.

7. A process for producing an aqueous emulsion according to claim 2, wherein the vinyl monomer is a member selected from the group consisting of glycidyl acrylate, glycidyl methacrylate, N-methylolacrylamide, N-methylolmethacryamide, acrylic acid, itaconic acid, maleic acid, 2-hydroxyethyl acrylate, 2-hydroxyethyl methacrylate, an N-alkoxymethylacrylamide and an N-alkoxymethylmethacrylamide.

* * * * *